Dec. 5, 1972    MIYOSHI OKAMOTO ET AL    3,705,226
ARTIFICIAL LEATHER AND A METHOD OF MANUFACTURING THE SAME
Filed June 30, 1970    2 Sheets-Sheet 1

United States Patent Office 3,705,226
Patented Dec. 5, 1972

3,705,226
ARTIFICIAL LEATHER AND A METHOD OF
MANUFACTURING THE SAME
Miyoshi Okamoto, Takatsuki, and Shunji Mizuguchi and Koji Watanabe, Otsu, Japan, assignors to Toray Industries, Inc., Tokyo, Japan
Filed June 30, 1970, Ser. No. 51,038
Claims priority, application Japan, July 9, 1969,
44/53,754, 44/53,755
Int. Cl. B29d 27/00; D04h 1/64
U.S. Cl. 264—162
11 Claims

ABSTRACT OF THE DISCLOSURE

An artificial leather having an internal configuration made up of three dimensionally interlaced bundles of extremely fine synthetic fibers sandwiched by a high polymeric substance layer of suede touch and raised surface of velours touch, and a method of manufacturing such leather from one or more webby masses of islands-sea-combination type filamentary fibers through application of needle punching, impregnation with temporary binder, removal of the sea component, impregnation with elastic substance, removal of the temporary binder, formation of the additional synthetic surface layer and raising of one surface of the thus obtained fibrous sheet.

---

Figure 1A:
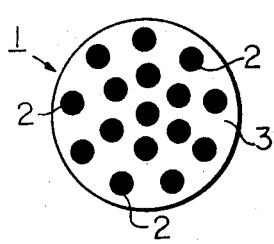

The present invention relates to an improved artificial leather and a method of manufacturing the same, and more particularly relates to an artificial leather having an improved internal configuration sandwiched by a surface of suede touch and a surface of velours touch and a method of manufacturing such an artificial leather from islands-sea-combination type filamentary fibers.

In spite of its conformity to the consumer's preference for a natural product, natural leather has its own shortcomings in its function and in the manufacturing process of end products from the material natural leather. Its inferior resistance against attack by water makes the laundering of it too difficult or almost impossible. Its particular, smell, weakness against mildew formation and relatively large apparent specific gravity restrict its wide variety of usefulness. The end product requires frequent maintenance treatment during the practical use thereof. Its natural origin makes it unsuitable for a mass production system and further, the constant quality of the obtained product can hardly be assured.

In order to mitigate the above-recited shortcomings inherent to natural leather, various types of artificial leathers have been proposed, developed and to some extent, introduced into the field of leather product industries. It is true that such conventional artificial leathers have been welcomed by the manufacturers due to their relatively enhanced ease in the production process but, from the view point of the functional quality of the end products made up of them, they cannot as yet meet the satisfaction of the consumers when compared with natural leather. One cannot neglect the fact that there is still a strong preference for natural leathers among the consumers in spite of the above-mentioned shortcomings possessed by them.

It is known that natural leather, in its condition used in the end product, is composed of technically termed grain side and flesh side. The grain side is made up of numerous interlaced bundles of fine collagen fibers and is closely related to the surface quality of the end product made of a natural leather. The flesh side consists of loosely interlaced fibrous tissues and gives the strength to the end product.

Most of the conventional attempts to improve the quality of artificial leather have been concentrated on making the surface quality of the artificial leather be something like that of the grain side of the natural leather. For example, provision of the suede touch to the surface of the artificial leather has been developed with utmost interest by the leather manufacturers and such effort has resulted in an appreciable improvement of the artificial leather. However, less interest by the leather manufacturers has been focussed upon the improvement of the internal configuration of the artificial leather and provision of desirable velours touch to the surface of the artificial leather.

In the manufacturing of most of the conventional type artificial leathers, staple fibers of from 1.5 to 5.0 denier fineness are used to compose the basic sheet layer, one surface of which is covered with a honey-combed porous elastic high-polymeric substance layer and is ground to provide a suede touch and another surface of which is made by slicing or grinding of the basic sheet layer. Therefore, that other surface configuration is composed of fibers of relatively large fineness connected to each other by suitable binders. This means that the mentioned surface is provided with a very rough surface touch which is undesirable for a direct touch to the human skin. In order to mitigate this rough touch, it is necessary to cover the surface with suitable backing material such as a natural leather or soft cloth. Further, because the componental fibers are bound fixedly to each other in the internal configuration of the artificial leather, the free movement of the fibers upon reception of an external load is considerably restricted and this causes lessened flexibility of the end product.

It has been also proposed to make an artificial leather of three-dimensionally interlaced internal configuration by way of needle punching technique. This technique is also accompanied with fatal drawbacks in that, when extremely fine fibers are used to compose the product, those fibers are oftentimes undesirably broken by impact attack applied thereto by the punching needles. So, it is as yet difficult to practically manufacture an artificial leather made up of flexible fine fibers using this technique.

A principal object of the present invention is to provide an artificial leather having a very natural leather-like internal configuration together with an excellent suede touch on one surface thereof and a preferable velours touch on another surface thereof.

Another object of the present invention is to provide an artificial leather having a very close likeness to natural leather while retaining the merits of artificial leather.

A further object of the present invention is to provide a novel method of manufacturing artificial leather having the above-mentioned advantage.

In order to satisfy the above-recited objects, the artificial leather of the present invention is composed of a basic sheet layer which contains three-dimensionally interlaced numerous fibrous bundles. Each bundle is composed of three or more extremely fine synthetic fibers of from 0.001 to 0.5 denier fineness. One surface of the basic sheet layer is covered with a high-polymeric substance layer and another surface thereof is covered with raised ends of the extremely fine fibers.

The artificial leather of the above-described configuration is preferably manufactured by using the hereinafter defined islands-sea-combination type filamentary fibers. The filamentary fibers are massed together, in a three-dimensionally interlaced disposition, to form a fibrous felt by, for example, a needle punching technique. Next, the fibrous felt is impregnated with a water soluble high-polymeric substance and thereafter, the sea component of the filamentary fibers is removed to form bundles of extremely fine fibers (island components) loosely bound to each other (from bundle to bundle) by the water soluble substance. Next, the fibrous mass containing the bundles is impregnated with a high-polymeric substance of elastic nature and the water soluble substance is removed thereafter. Finally, one surface of the basic fibrous sheet layer is covered with a high-polymeric substance layer and another surface thereof is raised through, for example, a buffing application.

The number of the extremely fine fibers within a fibrous bundle, which corresponds to the number of the island components in the transversal cross section of the islands-sea-combination type filamentary fibers, is preferably in a range from 3 to 5,000 and the percent weight content of the elastic high polymeric substance with respect to the total weight of the fibrous component is preferably in a range from 15 to 350. The fibrous mass in the sheet form is sliced in a direction substantially parallel to its surface during the manufacturing process as is later described in detail.

Figure 1B:
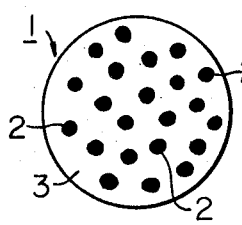
Figure 1C:
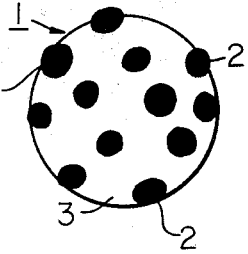
Figure 1D:
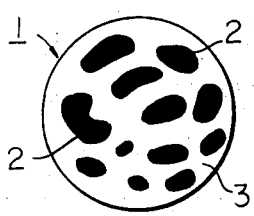
Figure 1E:
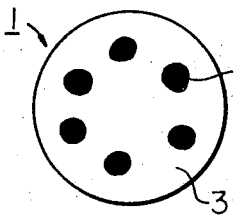
Figure 1F:
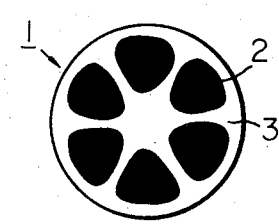
Figure 1G:
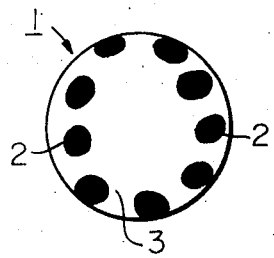
Figure 1H:
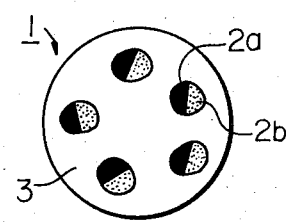
Figure 1I:
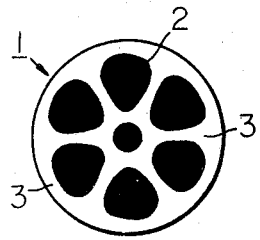
Figure 1J:
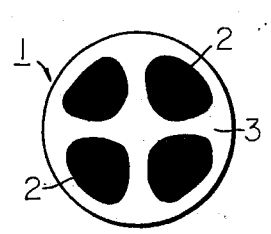
Figure 1K:
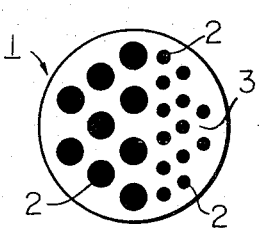
Figure 1L:
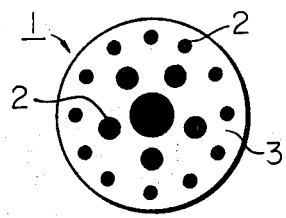
Figure 1M:
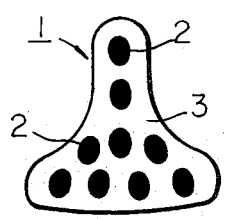
Figure 2:
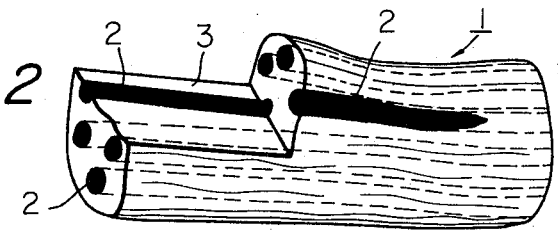
Figure 3A:
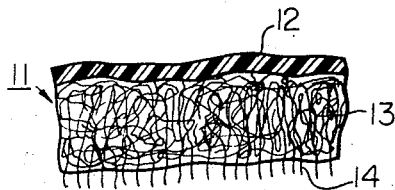
Figure 3B:
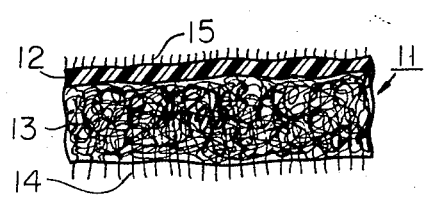

Further features and advantages of the present invention will be apparent from the following description, reference being made to the accompanying drawings; wherein FIGS. 1A to 1M are schematic transversal cross-sectional representations of various types of islands-sea-combination type filamentary fibers usable in the present invention, FIG. 2 is a perspective representation of an embodiment of the islands-sea-combination type filamentary fibers, FIGS. 3A and 3B are cross-sectional representations of the artificial leather of the present invention before and after the buffing application.

As is stated above, the fibrous bundle composing the basic sheet layer should be composed of extremely fine synthetic fibers of from 0.001 to 0.5 denier fineness. When the individual synthetic fiber is finer than this lower fineness limit, a strength of the fibers sufficient for withstanding practical use of the product cannot be obtained. Further, the dyeing property of the raised surface is undesirably degraded. On the contrary, when fineness of the individual synthetic fiber exceeds the upper fineness limit, the acquired artificial leather tends to be provided with a rough touch, rough handling, poor flexibility and degraded durability against bending in actual use thereof.

In the preferred embodiment, a fibrous bundle is required to be composed of from 3 to 5,000 fine synthetic fibers. In case the number of the synthetic fibers is fewer than this lower number limit, it becomes difficult to obtain fine fibers. Further, because the inter fiber actions such as inter fiber slippage is lost, one cannot expect the effect resulting from the bundled condition of fine fibers. Generally this effect is provided in the form of inter fiber slippage, softness resulted thereby and drapability of the product. Whereas, if the number of the individual synthetic fibers exceeds the upper limit, excessively small fineness of the individual synthetic fibers, that is, island components in the islands-sea-combination filamentary fibers must result and this is positively accompanied with undesirable fiber breakage in the fibrous felt formation. For example, such extremely fine fibers may be broken easily during the needle punching process.

As is above-mentioned, islands-sea-combination type filamentary fibers are used as the starting material in the manufacturing process of the artificial leather of the present invention.

The islands-sea-combination type filamentary fiber herein referred to is composed of at least two different types of high-polymeric components, one of which is named as "the island component" and another of which is named as "the sea component." In a given transversal cross section of the filamentary fiber, the island components are disposed in spaced positions isolated from each other by the sea component. The island components are elongated to an appreciable extent along the filamentary fiber. When the filamentary fiber is composed of three or more different types of high-polymeric components, the island component may be made up of two components. However, for a clear and easy understanding of the invention, the following description will be focussed upon the examples of two component types.

Referring to FIGS. 1A to 1M, some typical examples of the island components' disposition in the transversal cross section of the filamentary fiber are illustrated. The island components 2 may be arranged in circular alignment in the sea component 3 of the filamentary fiber 1 as shown in FIG. 1A or distributed randomly as shown in FIG. 1B. In some case, some of the island components 2 may be partly exposed on the peripheral surface of the filamentary fiber 1 as shown in FIG. 1C and the profile of the island components 2 may be deviated from a round pattern as shown in FIG. 1D. The arrangement of the island components such as illustrated in FIGS. 1A to 1D, wherein the island components are distributed in a two or more circular alignment, are rather preferred in the practical utilization than those illustrated in FIGS. 1E to 1G. FIG. 1H shows an example wherein the islands are made up of two different types of components 2a and 2b. The three dimensional internal configuration of the filamentary fiber 1 will be well understood from reference to the illustration shown in FIG. 2, wherein an island component 2 is shown exposed on the peripheral surface of the filamentary fiber 1.

The islands-sea-combination type filamentary fiber of the above-described configuration can be manufactured by various known methods. In some example, two component polymers are preliminarily extruded in such a manner that one component polymer embraces the other or extruded in a side-by-side condition. Next, three or more of thusly extruded polymer strands are amalgamated together prior to the solidification without disturbing the respective strand configurations and the amalgamated strands are extruded through a spinning hole in the form of a single filamentary fiber. Various known modifications can be derived from this example.

As to the total fineness of the filamentary fiber, requirement for an easy, effective and smooth fibrous felt formation requires that the total fineness should be in a range from 1.5 to 15 denier, more preferably in a range from 2.5 to 8 denier.

As for the polymer composing the island component, any of the conventionally known fiber formable polymers can be used. As typical examples, polymers such as polyamide, polyester, polyolefin, polyacrylonitrile, polyurethane copolymers and derivatives of the above-recited polymers can be used advantageously, more preferably from 0.005 to 0.35 denier.

The island components are understood to form the extremely fine fibers after later removal of the sea component and therefore, its fineness should be in a range from 0.001 to 0.5 denier.

The sea component should be selected from polymers having an affinity to the island component forming polymer. However, because the sea component must be removed away by dissolving in a later stage, it is required that the island polymer forming component should not be soluble in the solvent of the sea component forming polymer. Further, it is required from the practical point of view that the sea component forming polymer is easily soluble in solvents of low price and easily obtainable.

The islands-sea-combination type filamentary fibers thus obtained (in the ensuing description, this fiber will be termed as "ISC fibers") are next massed together in a web form on the known carding machines, cross lappers or random webbers. The obtained webby mass of the ISC fibers is next converted into fibrous felt advantageously through application of a needle punching operation. In some cases, two or more webby masses may be subjected to the needle punching together in a super-imposed disposition. When particularly required, webby masses of different types and/or different nature may be amalgamated together.

The needle punching should preferably be applied at a punching density of at least 200 punches/cm.$^2$ using such punching needles as are capable of hooking a plurality of the ISC fibers, more preferably one to three ISC fibers, in the webby mass or masses. Further, the needle punching should be performed to such an extent that, after the punching operation, the webby mass contains a sufficient number of ISC fibers elongated in a direction substantially perpendicular to the surface of the webby mass.

After completion of the fibrous felt formation, it is advantageous to shrink the fibrous felt by more than 18% and preferably more than 25%, in its surface area in a proper manner. In this case, it is recommended to form the felt from highly shrinkable ISC fibers.

Next, the fibrous felt is impregnated with water soluble high-polymeric substance such as polyvinyl alcohol, carboxylic methyl cellulose, methylcellulose or starch.

After this impregnation, the sea component of the ISC fibers is removed therefrom by treating the fibrous felt with suitable solvent. In this solvent selection, it should be noted that the selected solvent dissolves neither the island components of the ISC fibers nor the water soluble high polymeric substance imparted to the fibrous felt in the preceding stage. By the removal of the sea component, the resulting fibrous mass contains numerous bundles of extremely fine island components (now in the filament form) and water soluble high-polymeric substance loosely connecting the bundles to each other.

Next, the thusly obtained fibrous mass is impregnated with a high-polymeric substance of an elastic nature, which substance permeates into the inter-fiber spaces in the fibrous mass to fill them. For this impregnation, such polymers as polyurethane, natural rubber, copolymer of styrene and butadiene, copolymer of acrylonitrile and butadiene, or neoprene can be advantageously used in the form of an organic solvent solution or aqueous dispersion.

The amount of the elastic high-polymeric substance to be imparted to the fibrous mass should, preferably, be from 15 to 350 percent by weight of the total fibrous component contained within the fibrous mass. In case the content ratio of the elastic substance is smaller than the lower content limit, the spaces among the extremely fine fibers cannot be satisfactorily filled with the elastic substance and this causes degradation of the dimensional stability of the obtained artificial leather. Whereas, when the content ratio exceeds this upper limit value, a major part of the obtained artificial leather is occupied with the elastic substance and accordingly, the touch, handling and physical property of the obtained artificial leather become far different from those inherent in natural leather.

Simultaneously with or after the solidification of the elastic substance, the earlier applied water soluble high-polymeric substance is removed from the fibrous mass and a basic fibrous sheet layer is acquired. For some purposes, the thusly obtained basic fibrous sheet layer may be used as it is without application of further treatment.

In the process of the present invention, a high-polymeric substance layer is formed on one surface of the basic fibrous sheet layer. When a thick high-polymeric substance layer is formed, it is preferable to make the layer finely porous for enhancement of the air and wetness permeability of the obtained artificial leather. In case the layer is formed thin, it is not always necessary to make it porous. For this surface covering, such polymers as polyurethane, polyamide, polyester, halogenated vinyl polymers, alkylesters of acrylic acid or methacrylic acid or copolymer of butadiene with acrylonitrile can be preferably used.

The formation of this covering layer can be done, for example, by firstly coating the surface of the basic fibrous sheet layer with the selected polymeric solution, placing a smooth surface film over this coating and solidifying the high-polymeric substance. In another example, the polymeric solution may coat the filmy surface first, the basic fibrous sheet layer is placed over this coated surface and the coating substance solidified.

The surface of the basic fibrous sheet layer may be coated with elastic high polymer using a gravure coater. In another example, high polymer is coated over an embossed surface of a roller or a cloth and, after drying or partial drying, the coated surface is further coated with an adhesive agent. Next, the coated surface of the roller or the cloth is put in a pressure contact with the surface of the basic fibrous sheet layer, thereby a surface having the embossed pattern can be formed on the basic fibrous sheet layer.

If a known grinding operation is applied to the covered surface of the basic sheet layer, the surface can be provided with a suede touch.

Another surface of the basic fibrous sheet layer is subjected to a raising operation and the surface is covered with exposed ends of the extremely fine fibers. Thusly, the basic fibrous sheet layer is on its one surface provided with a velour type touch. In a preferred embodiment, that surface should be covered with the raised fibrous ends at a density of from $10^2$ to $10^6$ ends/cm.$^2$. When the density is smaller than this lower limit value, the resultant artificial leather lacks in warmth retainability, handling quality and gentle touch. On the contrary, even if the density exceeds this upper limit value, no further positive effect on the quality, such as strength, of the resultant artificial leather or on the frequency of the needle breakage can be expected.

For a further enhancement of the quality of the resultant artificial leather, it is, in a preferred embodiment, required to slice the mass of fibers in a direction substantially parallel to the surface of the mass. This slicing operation may be applied to the fibrous felt impregnated with the water soluble high-polymeric substance, to the fibrous mass from which the sea component is removed or to the basic fibrous sheet layer covered on its both surfaces with high-polymeric substance layers.

During the formation of the fibrous felt, many ISC fibers are placed in a disposition elongated, at least partially, in a direction substantially perpendicular to the surface of the fibrous felt. Therefore, when the fibrous felt or the mass of fibers developed therefrom is sliced in a direction substantially parallel to the surface, the sliced surface may be naturally provided with numerous fiber ends and by later application of a buffing operation, the sliced surface can be uniformly and densely covered with extremely fine fiber ends. On the other side surface of the mass of fibers, the fibrous components mostly elongate in a direction substantially parallel to the surface. So, the resultant artificial leather can be provided with two surfaces very unlike each other in their esthetic effect and functional quality. For example, the obtained artificial leather is anisotropic from surface to surface regarding crease and bending property.

When the slicing is performed before the superficial covering of the basic fibrous sheet layer with the high-polymeric substance layer, it is recommended that the sliced side surface is not used for the later superficial covering with the high-polymeric substance. This is because the sliced surface is provided with a very rough appearance and in some cases, recesses formed by the piercing of the punching needles.

Referring to FIG. 3A, an example of the artificial leather of the present invention is shown. One surface of an artificial leather 11 is covered with a high-polymeric substance layer 12 and another surface thereof is covered with raised fibrous ends 14 of a velours touch. By application of buffing on the layer 12, the surface of the layer 12 is covered with numerous fine fiber ends 15 of a suede touch as shown in FIG. 3B. The leather portion 13 between the two surfaces is full of three-dimensionally interlaced bundles of extremely fine fibers and elastic high-polymeric substance filling the inter-fiber spaces. Because the leather is both superficially and internally comprised of numerous extremely fine fibers, the leather is provided with excellent air and wetness permeability. It was empirically confirmed that the high-polymeric surface layer should preferably have a thickness in a range from 0.02 to 5 mm.

The artificial leather of the present invention is provided with the following advantageous features when compared with the conventional artificial leathers.

Because one surface thereof may be provided with a suede touch together with a velours touch on another surface, it is comfortable to the touch, has excellent warmth and wetness and air permeability. No attachment of backing material is specially required. When the artificial leather is to be attached to other articles, the presence of dense raised fine fiber ends considerably assists the binding effect of the binder.

Further, the three-dimensionally interlaced internal configuration provides the obtained artificial leather with desirable flexibility and enhanced durability against repeated bending. Separation of the superficial layer is remarkably lessened and the surfaces thereof may be provided with very natural leather-like creases. Enhanced flexibility makes the artificial leather conformable to any type of shape to which the leather must be attached.

Use of the ISC fibers as the material makes it easy, through raising and/or buffing operations, to cover the surfaces thereof with fine fiber ends. At the stage of the fibrous felt formation, for example, during the needle punching operation, the extremely fine fibers are contained within the ISC fibers of relatively layer fineness and are protected from possible breakage due to mechanical attacks during the operation.

The following examples are illustrative of the present invention, but are not to be construed as limiting the same.

EXAMPLE 1

ISC fibers of 3.0 denier fineness were formed using polyethylene terephthalate for the island component and polystyrene containing 5% by weight of polyethyleneglycol for the sea component. The weight content ratio of the island component was 50% and the number of the island components within the given transversal cross section of the ISC fiber was 16. The ISC fibers were provided with from 11 to 15 crimps per 1 inch length and were cut into 51 mm. length. The massed ISC cut fibers were processed on a carding machine and a cross lapper to be formed into a fibrous web. The obtained fibrous web was next subjected to needle punching at an extent of 700 punches/cm.$^2$ to form a fibrous felt of 320 g./m.$^2$ unit weight. Then the fibrous felt was immersed into a heated bath of carboxylic methylcellulose 1.5% solution and dried after a loose squeezing. Next, the fibrous felt was immersed two times into a trichloroethylene bath and after squeezing, dried in a condition still containing a small quantity of polystyrene composing the ISC fibers. By this treatment, fibrous components were intended to be released from fixed binding by the temporary binder (carboxylic methylcellulose). The fibrous mass thus obtained was impregnated with a dimethylformamide solution containing 15% by weight of polyurethane and squeezed in such a manner that 100 parts by weight of the fibrous component contained 151 parts by weight of polyurethane. Solidification of polyurethane was carried out within an aqueous bath. Then, the fibrous mass containing the polyurethane component was washed several times within a hot water bath and dried to obtain a basic fibrous sheet layer. One surface of the basic fibrous sheet layer was subjected to a high speed buffing for a smoothing purpose whereas another surface thereof was also buffed by sandpaper so as to provide a velours touch. On the other hand, a 25% polyurethane solution containing a small quantity of carbon black and vinylchloride was coated over a polyester film of 100μ thickness by a blade having 1.25 mm. clearance and, after coating, exposed to humid air. Then, the smoothed surface of the basic fibrous sheet layer was placed in a pressure contact with the coated side surface of the polyester film. After long time solidification, both were washed with hot water and the film was removed from the basic fibrous sheet layer. The obtained artificial leather was provided with a surface of refined esthetic effect and another surface of very natural leather-like velours touch.

Further, the surface covered with polyurethane layer was embossed, thereby a very natural leather-like luminous effect was provided on the surface. The crease property was very excellent and a bending strength larger than 1,000,000 times resulted.

EXAMPLE 2

The ISC fibers used in the preceding example were used and massed in a webby form, which was formed into a fibrous felt of 320 g./m.$^2$ unit weight by the application of needle punching at a density of 1,500 punches/cm.$^2$. Similarly, a fibrous felt of 160 g./cm.$^2$ unit weight was prepared by 300 punches/cm.$^2$ needle punching. The first fibrous felt was sandwiched by two of the second fibrous felts and the three were needle punched at 300 punches/cm.$^2$ in a superimposed disposition.

The felt was treated in a manner almost the same with that in Example 1. Solidification of the polyurethane component was performed with an aqueous bath containing from 3 to 9% of dimethylformamide. After incomplete drying, the fibrous mass was sliced into two laminar fibrous masses.

On the other hand, one surface of a polyethylene terephthalate film was coated, at 1.0 mm. thickness, with a dimethylformamide solution containing carbon blacks vinylchloride type resin and hydroxylic propylcellulose whose weight content was 10% with respect to the polyurethane component.

The coated surface of the film was placed in a pressure contact with the non-sliced side surface of the laminar fibrous mass after buffing application. After a long internal, the film was removed from the surface of the laminar fibrous mass and the latter was washed finished and embossed. The surface of the laminar fibrous mass was abraded by sandpaper so as to provide a raised surface of a velours touch. The laminar fibrous mass was converted into artificial leathers of extremely flexible nature, the bending strength thereof exceeded 1,000,000 times, uniform superficial esthetic effect, enhanced wetness permeability and improved functional properties.

The artificial leather thus made was formed into shoes for a field test. As to the outer surface quality its durability against water and mildew, color and function as the shoes were appreciated. As to the inner surface quality, its fit to the human foot, smoothness in feel, gentleness in touch and warm retainability were appreciated. The results obtained are illustrated in Table 1 together with those applied to natural leather and the conventional artificial leather.

TABLE 1

| | Natural leather | Conventional artificial leather | Present artificial leather |
|---|---|---|---|
| Overall evaluation | Medium | Bad | Fine. |
| Outer surface evaluation | do | Fine | Do. |
| Inner surface evaluation | Fine | Bad | Do. |

The actually obtained quantitative indication of the qualities was as is shown in Table 2.

TABLE 2

|  | Natural leather | Conventional artificial leather | Present artificial leather |
| --- | --- | --- | --- |
| Thickness in mm | 1.4–1.7 | 1.4–1.7 | 1.4–1.7 |
| Apparent density in g./cm.³ | 0.4–0.7 | 0.3–0.6 | 0.4–0.7 |
| Longitudinal tensile strength in kg./cm | 10–40 | 12–25 | 20–30 |
| Lateral tensile strength in kg./cm | 10–40 | 8–20 | 15–25 |
| Tear strength in kg | 4–10 | 4–6 | 4–6 |
| Bending strength in times | (¹) | (²) | (¹) |
| 20% bending force in gr | 200–400 | 300–600 | 200–400 |
| Smoothness of the back surface | Fine | Bad | Fine |

¹ Larger than 1,000,000.
² Smaller than 300,000.

EXAMPLE 3

ISC fibers were formed using polymers the same with those used in Example 1 and the individual ISC fiber, which contained 15 island components in the transversal cross section thereof, was provided with 12 crimps per 1 inch length. A fibrous web of 400 g./m.² unit weight was obtained by passing the fibers on a carding machine and a cross lapper and was subjected to a needle punching operation of 600 punches/cm.² and 10 mm. needling depth to form a fibrous felt of 0.10 g./cm.³ apparent density. The fibrous felt was then impregnated with 22% by weight of polyvinyl alcohol. Removal of the sea component was obtained by immersing the felt into a trichloroethylene bath. The obtained fibrous mass was then impregnated with 15% dimethylformamide solution of polyurethane squeezing was performed so that 100 parts by weight of polyurethane was imparted to 100 parts by weight of fibrous component in the treated mass and the solidification of the imparted polyurethane was performed in a water bath. By further immersion into a hot water bath, both dimethylformamide and polyvinyl alcohol were removed therefrom. After drying, both surfaces of the obtained basic fibrous sheet layer were buffed to make its thickness equal to about 1.0 mm.

On the other hand, a polymer solution was made from 21.4% by weight of polyurethane, 14.3% by weight of vinylchloride and 64.3% by weight of dimethyl-sulfoxide. Aside from this, 8 parts by weight of hydroxylic ethylcellulose was dispersed into 30 parts by weight of dimethyl-sulfoxide. The thusly prepared dispersion was added to 100 parts by weight of the firstly prepared polymer solution and further, 8 parts by weight of carbon black was added to this solution mixture.

The thusly prepared mixture was coated over a surface of the basic fibrous sheet layer and after solidification, was washed with hot water of 70° C. temperature. After drying, the sheet was superficially ground to have a 1.2 mm. thickness. Another surface of the sheet was slightly brushed for raising of the extremely fine fiber ends.

The quality of the obtained artificial leather is shown in Table 3 together with those of the natural leather and the conventional artificial leather.

TABLE 3

|  | Natural leather | Conventional artificial leather | Present artificial leather |
| --- | --- | --- | --- |
| Thickness in mm | 1.0–1.3 | 1.0–1.3 | 1.0–1.3 |
| Apparent density in g./cm.³ | 0.4–0.7 | 0.3–0.5 | 0.4–0.6 |
| Longitudinal tensile strength in kg./cm | 4–20 | 5–15 | 20–25 |
| Lateral tensile strength in kg./cm | 4–20 | 3–12 | 18–23 |
| Tear strength in kg | 2–6 | 1–3 | 2–5 |
| Bending strength in times | (¹) | (²) | (¹) |
| 20% bending force in g | 1.0–2.0 | 2.5–4.0 | 1.0–2.0 |

¹ Larger than 1,000,000.
² From 500,000 to 1,000,000.

The obtained artificial leather was characterized by a flexible handling very much like that of the natural leather together with enhanced mechanical properties and the superficial softness thereof was far superior to that of the conventional artificial leathers.

EXAMPLE 4

ISC fibers of 3 denier fineness were manufactured using polystyrene for the sea component and polyethylene terephthalate for the island component. The obtained ISC fibers were cut into 51 mm. lengths.

Another type of ISC fibers of 6 denier fineness were manufactured using copolymer of polystyrene with acrylonitrile for the sea component and polyamide for the island component. The obtained ISC fibers were cut into 76 mm. lengths. Both types of ISC fibers contained 16 island components within a transversal cross section thereof and the content ratio of the two components was 50:50.

Both types of ISC fibers were then mixed together at a mixing ratio of 50:50 and the mixed fibrous mass was formed into a fibrous web by processing on a random webber and the resulted web was subjected to a needle punching operation to obtain a fibrous felt of 700 g./m.² unit weight. The fibrous felt was then imparted with carboxylic methylcellulose and immersed into a trichloroethylene bath for removal of the sea component. Next, the fibrous mass was impregnated with 20% dimethylformamide solution of polyurethane and, after removal of the solvent and drying, the obtained fibrous mass was sliced into two laminar fibrous masses. The sliced surface was coated with dimethylformamide solution of polyurethane and vinyl chloride and solidification thereof was performed within a hot water bath. Removal of dimethylformamide and carboxylic methylcellulose was performed also within a hot water bath. Next, the coated surface was ground for about 0.4 mm. Another surface was buffed so as to make the thickness of the sheet 1.1 mm. The resultant artificial leather was provided with a honeycombed ground surface of a suede touch and another raised surface of a velours touch. Further, the product was provided with a very high class natural leather-like appearance, touch and handling and its wetness permeability was up to 4,000 g./24 hrs.

EXAMPLE 5

ISC fibers, the same as the first type ISC fibers used in Example 4 were used. The content ratio of both components was 50:50 and the fiber contained 15 island components in its transversal cross section. A fibrous felt of 700 g./m.² unit weight was produced from the fibers by needle punching application. The felt was then immersed into a polyvinyl alcohol bath and squeezed at a percent squeeze of 150. After drying, the felt was treated with trichloroethylene for removal of the sea component. Next, the felt was sliced into two laminar sheets, which were subsequently impregnated with 20% dimethylformamide solution of polyurethane. After solidification in water, the sheet was treated with hot water for 30 minutes for removal of polyvinylalcohol. The sliced side surface was buffed after the sheet was passed through heated rollers of 165° C. The obtained artificial leather was provided with a desirable superficial suede touch and handling and extremely fine raised fiber ends covering the buffed surface.

EXAMPLE 6

ISC fibers of 3 denier fineness were produced using nylon 6 for the island component and copolymer of polyethylene and acrylonitrile for the sea component at a content ratio of 60:40. The obtained ISC fibers, which contained 15 island components in its transversal cross section, was cut into 76 mm. lengths. A fibrous felt of 600 g./m.² unit weight was produced from the fibers by webbing and needle punching operations. Then the felt was impregnated with 6% by weight of carboxylic methylcellulose. After removal of the sea component in a manner the same as that in the preceding example, the sheet was sliced in the middle (in thickness) to form two sheets. Next, the sliced sheet was impregnated with 10% dimethylformamide solution containing 75 parts by weight of polyurethane and 25 parts by weight of acrylonitrile butadiene synthetic rubber and was squeezed at a squeezing percent of 400. In the following process, the surface was coated with 0.2 mm. thickness layer mainly composed of polyurethane, which layer was solidified by immersion into water. Then, the product was treated with hot water of 90° C. temperature for removal of carboxylic methylcellulose and the surface was embossed. The acquired artificial leather was provided with a very natural leather-like appearance, touch and handling together with excellent smoothness and flexibility.

EXAMPLE 7

ISC fibers of 3 denier fineness were produced by using polyethylene terephthalate for the island component and polystyrene for the island component at a content ratio of 60:40. The produced ISC fiber, which contained 42 island components within the transversal cross section thereof, was provided with 12 crimps per 1 inch length and was cut into 51 mm. length. A fibrous felt of 800 g./cm.² unit weight was manufactured from the webby mass of the fibers by application of a needling operation at a density of 600 punches/cm.² and the needling depth of 8 mm. The obtained felt was impregnated with 10% aqueous solution of polyvinyl alcohol and squeezed at a squeezing percent of 100. After drying, the felt was immersed into a trichloroethylene bath for removal of the sea component. After squeezing, the fibrous mass was immersed into methylalcohol bath. Then, the fibrous mass was impregnated with 20% dimethylformamide solution containing 75 parts by weight of polyurethane and 25 parts by weight of polyacrylonitrile-butadiene copolymer and was squeezed at a percent squeeze of 250. Solidification of the impregnated substance was performed within a water bath. Next, the fibrous mass was treated with hot water of 90° C. temperature for removal of polyvinylalcohol. After drying, the sheet was sliced into two laminar sheets, and the sliced surfaces were subjected to a buffing operation for raising of numerous fine fiber ends. The obtained artificial leather was provided with a very natural leather-like suede touch and smooth surface.

The other surface of the leather-like sheet was coated with 20% polyurethane solution in dimethylformamide with a gravure coater at a thickness of 0.75 mm. and immersed into a water-bath for solidification. Then the coated surface was buffed with 200 mesh sandpaper. The obtained product was provided with an extremely fine raised surface together with soft handling and a warm touch. The cool touch characteristic of conventional artificial leather was absent. Another side surface of the product was provided with a suede touch.

EXAMPLES 8–10

Nylon 6 was used as the islands component forming polymer and the number of the island components was selected as 1, 3, 16 and 520 within a transverse cross section of a single filament. A copolymer of acrylonitrile and styrene was used as the sea component forming polymer. The content ratio of the both components was 50:50. After spinning, the filaments were subjected to a drawing process so as to have a fineness of 3.0 denier. The filament was provided with from 12 to 17 crimps per 1 inch length thereof and the filament was cut into staple fibers of 51 mm. length. Webs were formed on a carding machine and a cross lapper. The obtained webs were all subjected to the process until the impregnation with binding agent in a manner the same with that employed in the preceding Example 7. One surface of the obtained leather like sheets were subjected to the buffing by a sandpaper of 120 mesh, respectively whereas other surfaces thereof were subjected to the buffing by a sandpaper of 250 mesh. The thickness of the basic sheet layer was adjusted to 1.4 mm.

Aside from this preparation, a release paper provided with superficial embossed pattern was coated in a uniform thickness with the solution prepared as in Example 3 and dried at a temperature of 120° C. After the drying, the thickness of the coated layer was about 50 microns. Thusly coated surface was further coated at a thickness of 100 microns with the same solution. Thusly prepared coated surface of the release paper was put in a pressure contact with the surface of the basic sheet layer buffed by the sandpaper of 250 mesh at a pressure of 2 kg./cm.² for 20 seconds. After drying at a temperature of 120° C., the release paper was removed from this pressure contact and another surface of the basic sheet layer was again buffed for raising purpose. The respective sheet was provided with a so-called calf skin touch on one surface thereof and with a velours touch on another raised surface thereof. The relation between the number of the island components and the property of the obtained products was as is shown in the following table.

|  | Blank | Example Number | | |
|---|---|---|---|---|
|  |  | 8 | 9 | 10 |
| Number of the island component | 1 | 3 | 16 | 520 |
| Thickness in mm. | 1.3–1.4 | 1.3–1.4 | 1.3–1.4 | 1.3–1.4 |
| Density in g./cm.³ | 0.36 | 0.42 | 0.42 | 0.41 |
| Lengthwise strength in kg./cm. | 23 | 24 | 26 | 29 |
| Transverse strength in kg./cm. | 15 | 18 | 20 | 22 |
| Bending force at 20% elongation in g. | 370 | 280 | 270 | 280 |
| Surface touch | Bad | Good | Good | Good |

In the case of Blank, the surface touch was very rough because of the lack in the raising effect. By increasing the number of the island components to three or more, the products could be provided with very soft handling quality. Further, the products of 3 or more island component cases were provided with excellent resiliency, which is supposed to be resulted from the inter fiber relationship. The handling quality of the products was converted from the paper or rubber like one to the fiber or leather like one.

EXAMPLE 11

In the process of the Examples 8 to 10, the thickness of the solution to be coated to the release paper was selected as 150 microns. After an imperfect drying application, the release paper was attached to the basic sheet layer and the two were subjected to a perfect drying. After the removal of the release paper, the product was superficially provided with the emboss pattern and the property thereof was substantially the same with those of the products obtained in Examples 8 to 10.

EXAMPLE 12

Polyethylene terephthalate type polymer containing 8% by mol of dimethylisophthalate as the copolycondensation unit was used for the island components and polystyrene containing 2% of polyethylene glycol was used for the sea component. The ISC fibers of this composition, of 3.7 denier fineness and 51 mm. length were formed into a web of 120 g./m.² unit weight on a random webber. Four of the webs in a superimposed disposition were subjected to a needle punching operation at a punching density of 1,000 punches/cm.² to obtain a needle punched felt of 0.136 g./m.² apparent density. The thusly obtained felt was immersed within a hot water bath of 98° C. temperature for the longitudinal and transverse directional shrinkages of about 35%. Next, the shrunk felt was immersed into a 15% aqueous solution of polyvinylalcohol. After squeezing, the felt was further immersed into a trichloroethylene bath with five times of intermediate squeezing operation. The thusly obtained sheet was impregnated with a 15% emulsion of a copolymer of acrylonitrile and styrene and, thereafter, solidification was performed within a 15% aqueous solution of calcium chloride. After the solidification, both surfaces of the sheet were buffed with a sandpaper. After the completion of the buffing operation, the sheet was sliced at the middle of its thickness and the sliced surfaces were subjected to a further buffing operation to obtain two sliced sheets of 1.0 mm. thickness.

Aside from this, a surface of a release paper was coated at a thickness of 100 microns with a 25% dimethylformamide solution of polyurethane and the coated surface thereof was, in an imperfectly dried condition, put into a pressure contact with the buffed surface of one of the sliced sheets. A perfect drying was performed at a temperature of 100° C. After this perfect drying operation, the release paper was removed from the contact and the coated sheet was pressed for two times between metal screens of 160° C. temperature. The obtained product was superficially provided with a polyurethane layer on which the pattern of the metal screen was printed. Another surface thereof was raised. The finally obtained product was provided with a surface of velours touch together with a urethane layer for resiliency effect and was suitable for an apparel use.

What we claim is:
1. An improved method of manufacturing an artificial leather comprising, in combination,
   (a) forming a sheet of fibrous felt from numerous islands-sea-combination type filamentary fibers by webbing and needle punching operations,
   (b) impregnating said fibrous felt with water soluble high polymeric substance,
   (c) removing sea component from the thusly impregnated fibrous sheet by treatment with its solvent, thereby releasing bundles of remaining island components,
   (d) slicing said fibrous sheet in a direction parallel to its surface,
   (e) impregnating said sliced fibrous sheet containing said bundles of island components with elastic high polymeric substance and solidifying said elastic high polymeric substance,
   (f) removing said water soluble high polymeric substance from the thusly said impregnated fibrous sheet on or after said solidification, thereby forming a basic fibrous sheet layer, and
   (g) forming a high polymeric substance layer on one surface of said basic fibrous sheet layer in combination with raising another surface of said basic fibrous sheet layer.
2. The improved method of claim 1, wherein said high polymeric substance layer is formed in a wet manner and the thusly formed layer is made honey-combedly porous by application of a grinding action thereto.
3. The improved method of claim 1, wherein said needle punching operation is at a density of at least 200 punches/cm.$^2$.
4. The improved method of claim 1, wherein formation of said needle punching is done by using punching needles capable of hooking one to three of said filamentary fibers.
5. The improved method of claim 1, wherein each of said islands-sea combination fibers comprises at least three island component fibers having a fineness of 0.001 to 0.5 denier in a sea component.
6. The improved method of claim 1, wherein said elastic high polymeric substance is from 15% to 350% by weight of the total fibrous content of said sheet.
7. The improved method of claim 1, wherein said high polymeric surface layer formed on said one surface is a porous layer of polyurethane.
8. The improved method of claim 1, wherein said fibers comprise a mixture of first fibers using polystyrene as the sea component and polyethylene terephthalate as the island component with second fibers using copolymer of polystyrene and acrylonitrile as the sea component and polyamide as the island component.
9. The improved method of claim 8, wherein said first fibers and said second fibers are used in approximately equal proportions.
10. The improved method of claim 1, wherein after removal of said water soluble high polymeric substance the sliced sheet is passed between heated rollers and the sliced side is then buffed.
11. The improved method of claim 1, wherein said fibers comprise a copolymer of polyethylene and acrylonitrile as the sea component and nylon 6 as the island component.

References Cited
UNITED STATES PATENTS

| | | | |
|---|---|---|---|
| 3,562,374 | 2/1971 | Okamoto et al. | 161—159 |
| 3,496,001 | 2/1970 | Minobe et al. | 161— DIG. 2 |
| 3,424,604 | 1/1969 | Fukushima et al. | 161—DIG. 2 |

WILLIAM J. VAN BALEN, Primary Examiner

U.S. Cl. X.R.

161—67, 159, 160, Digest 2; 264—49, 128, 158, 174; 117—140, 161